US010249162B2

(12) United States Patent
Auvenshine et al.

(10) Patent No.: US 10,249,162 B2
(45) Date of Patent: Apr. 2, 2019

(54) MONITORING FOR SAFETY IN MOVING ENVIRONMENTS

(71) Applicant: INTERNATIONAL BUSINESS MACHINES CORPORATION, Armonk, NY (US)

(72) Inventors: John J. Auvenshine, Tucson, AZ (US); Anthony J. Ciaravella, Tucson, AZ (US); John T. Olson, Tucson, AZ (US); Richard A. Welp, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 14/886,337

(22) Filed: Oct. 19, 2015

(65) Prior Publication Data

US 2017/0109987 A1 Apr. 20, 2017

(51) Int. Cl.
*G08B 21/02* (2006.01)
*B60N 2/00* (2006.01)
*G08B 21/22* (2006.01)
*B60R 21/015* (2006.01)
*G08B 21/24* (2006.01)

(52) U.S. Cl.
CPC ............ *G08B 21/02* (2013.01); *B60N 2/002* (2013.01); *B60R 21/015* (2013.01); *B60R 21/01512* (2014.10); *B60R 21/01516* (2014.10); *B60R 21/01544* (2014.10); *B60R 21/01556* (2014.10); *G08B 21/22* (2013.01); *G08B 21/24* (2013.01); *B60R 2300/8006* (2013.01); *B60R 2300/8013* (2013.01)

(58) Field of Classification Search
CPC ......... G08B 21/22; G08B 21/24; B60N 2/002
See application file for complete search history.

(56) References Cited

U.S. PATENT DOCUMENTS

| 6,104,293 | A | 8/2000 | Rossi |
| 6,362,734 | B1 * | 3/2002 | McQuade ............... B60R 22/48 180/267 |
| 7,348,880 | B2 | 3/2008 | Hules et al. |
| 8,038,213 | B2 | 10/2011 | Owens |
| 8,058,983 | B1 | 11/2011 | Davisson et al. |
| 8,841,997 | B2 | 9/2014 | Silveira |

(Continued)

OTHER PUBLICATIONS

"Swimming Pool Alarm", Brick House Security, retrieved on Oct. 16, 2015 from http://www.brickhousesecurity.com/product/swimming+pool+alarm.do.

(Continued)

*Primary Examiner* — Laura N Nguyen
(74) *Attorney, Agent, or Firm* — Griffiths & Seaton PLLC

(57) ABSTRACT

Various embodiments for monitoring safety by a processor. A presence of a living thing is detected inside an enclosed environment to be monitored. The enclosed environment is capable of motion. The presence of the living thing is monitored in combination with at least one environmental factor in the enclosed environment. If the at least one environmental factor exceeds a predetermined threshold, an alert notification to indicate a current status of the environmental factor is provided to a user.

15 Claims, 4 Drawing Sheets

(56) References Cited

U.S. PATENT DOCUMENTS

| | | | |
|---|---|---|---|
| 2003/0222775 A1* | 12/2003 | Rackham | B60R 25/1004 340/457 |
| 2004/0239138 A1* | 12/2004 | Kamiya | B66F 17/003 296/68.1 |
| 2007/0009689 A1 | 1/2007 | Murer | |
| 2007/0083298 A1* | 4/2007 | Pierce | B60R 11/02 701/1 |
| 2007/0096891 A1 | 5/2007 | Sheriff et al. | |
| 2007/0279206 A1 | 12/2007 | Singfield | |
| 2008/0000477 A1 | 1/2008 | Huster et al. | |
| 2008/0004774 A1 | 1/2008 | Wieczorek et al. | |
| 2013/0049955 A1 | 2/2013 | Hoover et al. | |
| 2013/0201013 A1* | 8/2013 | Schoenberg | B60R 22/48 340/438 |
| 2014/0253313 A1 | 9/2014 | Schoenberg | |
| 2014/0306838 A1* | 10/2014 | Beumler | B60N 2/28 340/988 |
| 2014/0361889 A1 | 12/2014 | Wall, II et al. | |
| 2015/0130604 A1 | 5/2015 | Gomez Collazo et al. | |
| 2016/0171859 A1* | 6/2016 | Bowlus | G08B 21/02 340/457 |
| 2016/0189450 A1* | 6/2016 | Anderson | G06K 19/07381 340/5.51 |
| 2016/0249191 A1* | 8/2016 | Avrahami | H04L 67/12 |

OTHER PUBLICATIONS

Cars-N-Kids Integrated iAlert Seat Monitor, retrieved Oct. 16, 2015 from http://carseatmonitor.com/.

"Bluetooth Tracking Devices, Location Tracking Technology", retrieved Oct. 16, 2015 from http://www.trackingsticker.com/.

Freelon, Kiratiana, "People keep leaving children in hot cars. This teen thinks her invention can help.", The Washington Post, Jul. 25, 2014, Retrieved Oct. 16, 2015 from http://www.washingtonpost.com/news/parenting/wp/2014/07/25/people-keep-leaving-children-in-hot-cars-this-teen-thinks-her-invention-can-help/.

* cited by examiner

MONITORING FOR SAFETY IN MOVING ENVIRONMENTS

BACKGROUND OF THE INVENTION

Field of the Invention

The present invention relates in general computing systems, and more particularly to, various embodiments for monitoring for safety for persons and animals as occupants in movable enclosed environments.

Description of the Related Art

Computers and computing-related technologies are increasingly used in today's society to process and store information, communicate, make decisions, and other functionality. Today, computers and computing-related technologies may be found at home, in the workplace, or at school.

SUMMARY OF THE INVENTION

Various embodiments for monitoring for safety by a processor are provided. A presence of a living thing is detected inside an enclosed environment to be monitored. The enclosed environment is capable of motion. The presence of the living thing is monitored in combination with at least one environmental factor in the enclosed environment. If the at least one environmental factor exceeds a predetermined threshold, an alert notification to indicate a current status of the environmental factor is provided to a user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Every year there are reports of children being left unattended or improperly restrained in their car seats, or pets left in hot or cold vehicles. The outcome of these events typically result in physical harm or death for the child or animal. Today, many car seats are available that provide a high level of safety and security for occupants, so long as the seats and associated restraints are installed and used according to the manufacturer's instructions. Often times, however, users install the seats and/or use the restraint systems in an incorrect manner, putting the safety of the occupant at risk without the user even aware of the potential risk posed to the occupant.

In view of these challenges, a need exists for a solution whereby the user is made aware of these potential dangers before any harm results to persons or animals.

To address these challenges, the illustrated embodiments provide mechanisms for monitoring movable enclosed physical environments for the safety of occupant(s). The mechanisms of the illustrated embodiments monitor for the presence of individuals or animals in these enclosed spaces, monitor whether the occupants are restrained, and monitor whether the occupants are correctly restrained.

If the mechanisms of the illustrated embodiments detect a potential safety hazard, the mechanisms may, in one embodiment, inform a user of the hazard, for example, via a wireless communications protocol (e.g., Bluetooth® transmission) to a mobile device to alert the user. In this manner, the user is able to take appropriate steps to mitigate any potential danger before any harm occurs to the occupant.

Figure 1:
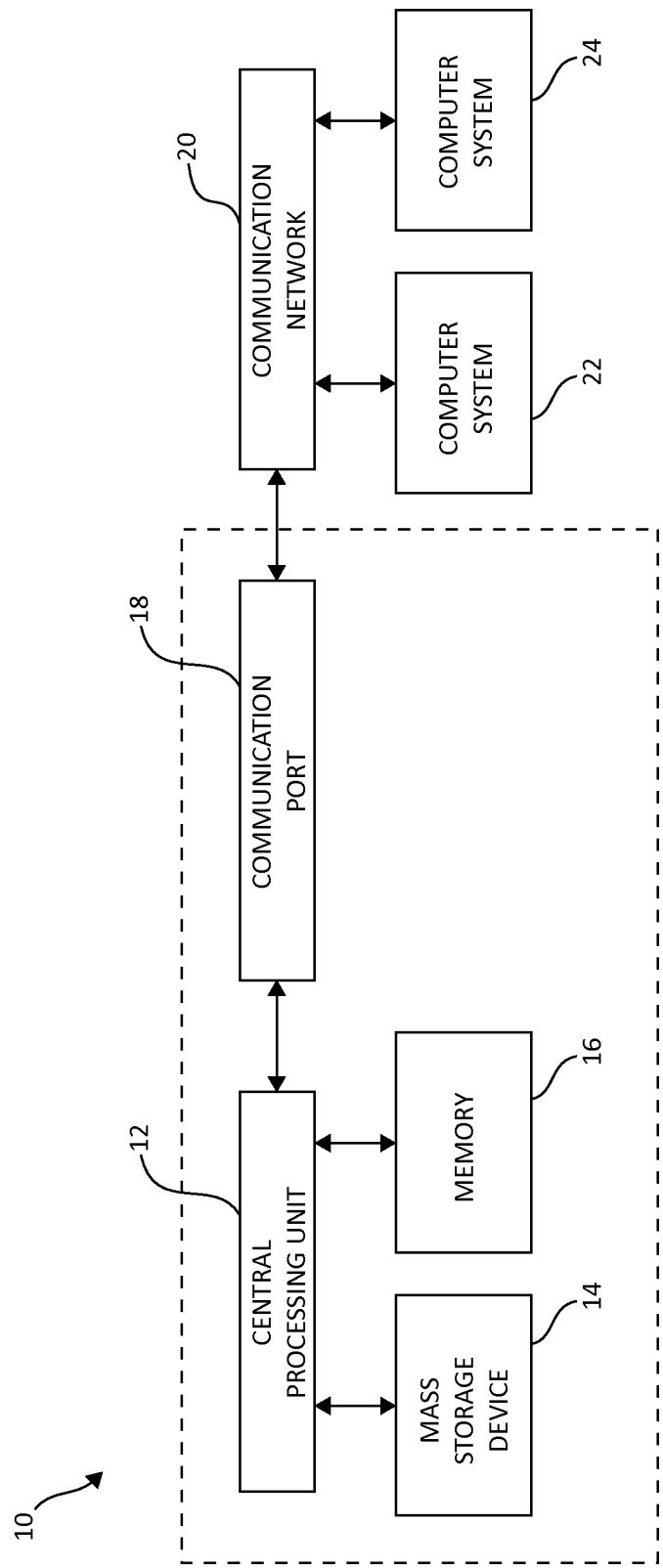
FIG. 1 is an exemplary block diagram showing a hardware structure for performing safety monitoring functionality, in which aspects of the present invention may be realized.

Turning now to the Figures, and first to FIG. 1, exemplary architecture 10 of a computing system environment is depicted. Architecture 10 may, in one embodiment, be implemented at least as part of a system for effecting mechanisms of the present invention. The computer system 10 includes at least one central processing unit (CPU) 12, which is connected to communication port 18 and memory device 16. The communication port 18 is in communication with a communication network 20. The communication network 20 may be configured to be in communication with systems 22, 24 and architecture 10, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere, and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12. As one of ordinary skill in the art will appreciate, a number of systems 10 may be configured in a connected and/or distributed way, physically located together or across a long geographically connected network, for example.

Figure 2:
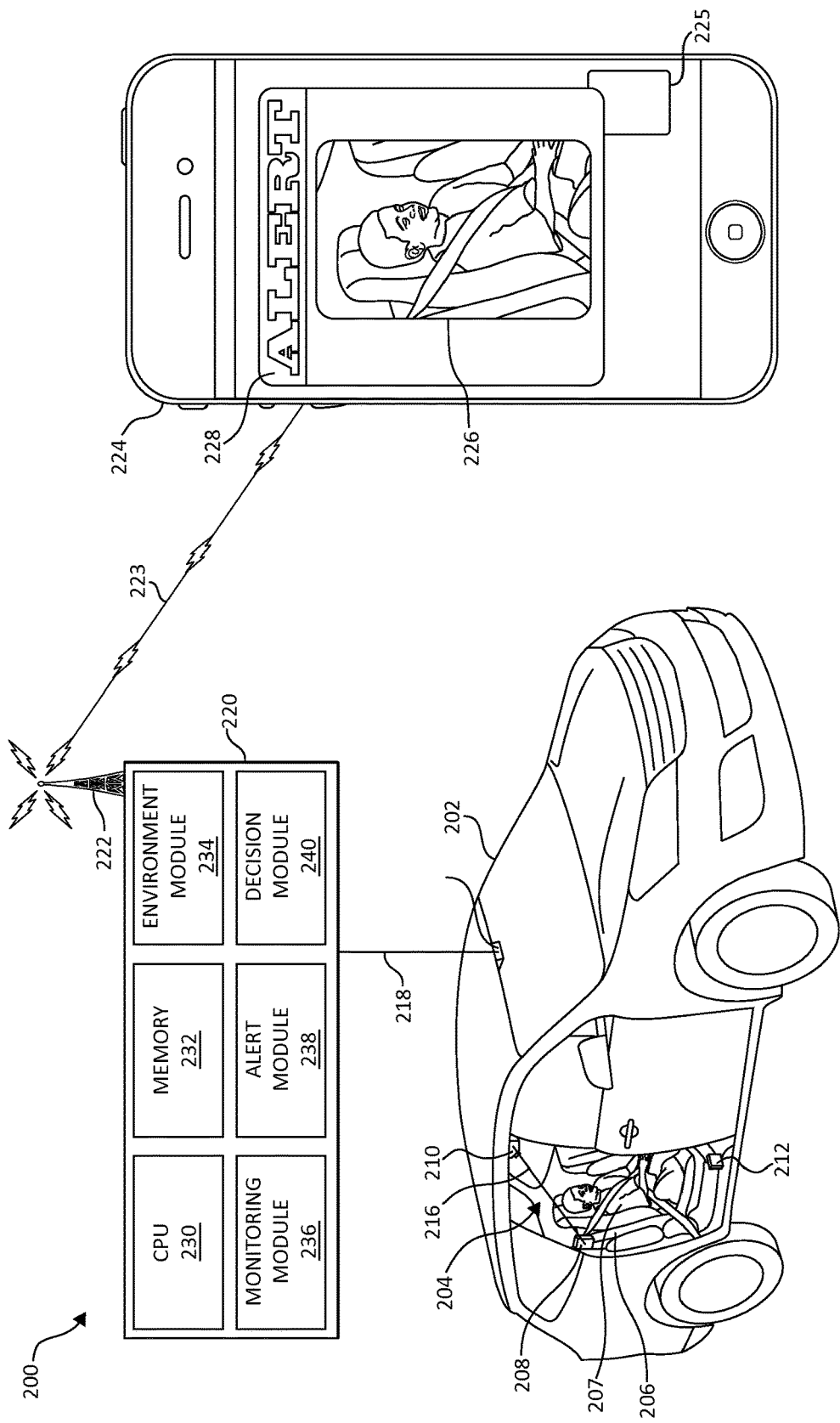
FIG. 2 is an exemplary block diagram showing a hardware structure of a monitoring device, in combination with an enclosed movable environment and a remote device, again in which aspects of the present invention may be realized.

FIG. 2 is a block diagram of a system 200 for monitoring for safety in movable enclosed environments of occupants in accordance with one embodiment of the present invention. A vehicle 202 is shown having an interior cabin 204 that is representative of an enclosed movable environment in which an occupant rests. Here, a child 207 is sitting on a car seat 206 as shown as an occupant 207 in the vehicle 202.

In the illustrated embodiment shown as system 200, a variety of detection hardware is implemented in the vehicle 202 to provide information concerning the status of the occupant 207 and/or the physical characteristics of the enclosed environment 204. For example, a sensor (e.g., pressure) 208 may be integrated into the seat portion of the car seat 206. In addition, sensor 208 may be configured to monitor certain aspects of the seatbelt restraint system associated with the car seat 206. For example, the sensor 208 may determine if the restraint system is fastened. In other embodiments, the sensor 208 may determine if the restraint system is correctly fastened by monitoring such characteristics as seatbelt tension or other physical characteristics found in a correctly fastened restraint system. Accordingly, sensor 208 may measure various physical aspects associated with the car seat 206 and car seat restraint system, such as a weight of an occupant 207, or tension across a certain portion of the restraint system, or whether a buckle is secured, or a combination of physical characteristics.

In addition to sensor 208, additional devices may be also installed in the vehicle 202, communicative with the sensor(s) 208 and other electrical components of the vehicle using communication link 216. For example, a camera sensor 210 may record information. The camera sensor 210 may be an infrared camera for recording temperature information. The camera sensor 210 may be configured to obtain visual cues from the occupant 207, such as facial expressions, or provide facial cues to the system 200 such that the system 200 can determine who a particular occupant of the vehicle 202 is by virtue of facial recognition technology. The camera sensor 210 may determine that the particular occupant 207 of the vehicle 202 is a dog, or a cat, or other household pet, for example. In one embodiment, the camera sensor 210 may be equipped with a microphone or similar input device to monitor sounds emitting from the occupant 207, such as a bark, or a child's cries, for example.

In addition to camera sensor 210, a thermometer 212 may record temperature data of the vehicle interior 204. The thermometer 212 may, in one embodiment, be equipped with such technologies as infrared detection capability so as to monitor the surface temperature of the occupant 207, or surface temperatures of the car seat 206, or other surfaces in the interior environment of the vehicle 202. In addition to the thermometer 212, an accelerometer sensor 214 may provide data to the system 200 for the system 200 to determine if the vehicle 202 is in motion, or in an alternative embodiment, detect whether the vehicle has made a sudden acceleration or sudden stop. As one of ordinary skill in the art will appreciate, the various sensors 208, 210, 212, and 214 (and others not shown for purposes of illustrative convenience), may vary in terms of their form factor, accompanying functionality, communicative and operative aspects, and other features according to a particular installation and/or application.

In the depicted embodiment shown in FIG. 2, the various hardware sensor components in the vehicle 202 are in communication with a controller 220 as shown over link 218. As one of ordinary skill in the art will appreciate, the link 218 may encompass a wide variety of wired, wireless, and other technologies sufficient to bi-directionally transfer information from/to the controller 220 and the vehicle 202 and the various electronic components of the vehicle 202.

The controller 220 contains hardware and software components for effecting various mechanisms of the illustrated embodiments. The depicted embodiment of the controller 220 incorporates a CPU 230, memory 232, an environment module 234, a monitoring module 236, an alert module 238, and a decision module 240 as shown.

The CPU 230 may, as one of ordinary skill in the art will appreciate, implement hardware mechanisms for processing data received over communication link 218 from the various sensors 208, 210, 212, and 214. In addition, memory 232 may retain information that is gleaned from the various sensors 208, 210, 212, and 214.

The various environment module 234, monitoring module 236, alert module 238, and decision module 240 may be incorporated into various hardware, firmware, and software components of the controller 220 as one of ordinary skill in the art will anticipate. The separate designations of the environment module 234, monitoring module 236, alert module 238, and decision module 240 are shown to illustrate, among other aspects of the present invention, the differing functionality of the controller 220 so that various mechanisms of the illustrated embodiments may be effected. In addition, the environment module 234, monitoring module 236, alert module 238, and decision module 240 may function in conjunction with CPU 230, memory 232, or other software and/or hardware components associated with controller 220 to accomplish various tasks.

Environment module 234 may, in one embodiment, generate a virtualized version of the internal environment 204 of the vehicle 202, including such physical characteristics as various temperature characteristics, occupants 207, weight(s), noises or other sounds, airflow, velocity, and the like. The environment module 234 then constructs the enclosed environment 204 in a digital basis for interpretation by the CPU 230, memory 232, and/or other modules of the controller 220.

Monitoring module 236 may, in one embodiment, conduct functionality for monitoring various physical aspects of the enclosed environment 204 such as monitoring a current surface temperature, monitoring a current velocity, monitoring sounds emitted by the occupant 207 or otherwise, monitoring airflow in the enclosed environment 207, or other aspects, which may then be compared with stored information in the memory 232 or virtually constructed in the environment module 234.

In one embodiment, the stored information in the memory 232, such as a certain low or high temperature threshold, may be compared against the current temperature information gleaned from the vehicle 202. If, for example, an ambient air temperature is found to exceed a certain high threshold, the decision module 240 may be informed of such. The decision module 240 may then make a determination to inform the alert module 238, which then may provide an alert notification of some kind As one of ordinary skill in the art will appreciate, the alert module 238 may send information through antenna 222 using a wireless communications protocol, such as 802.11 wireless ("WiFi") or Bluetooth® communications protocol (denoted here in FIG. 2 by virtue of wireless symbol 223.

Shown remote from the controller 220 is a device 224, which receives the wireless alert notification 223 from the controller 220. In addition, the device 224 may also send communicative information to the controller 220 such that information flows from and to the device 224 in an bi-directional manner from the controller 220. As one of ordinary skill in the art will appreciate, the device 224 may include such devices as telephones, Personal Desktop Assistant (PDA) devices, tablet devices, portable computing devices, or any device capable of sending and/or receiving data and interpreting the data to a user.

In the depicted embodiment shown in FIG. 2, the telephone device 224 receives the alert notification via a safety application 225 ("app"), which may be installed in the device 224 and leverage the various hardware, software, firmware, and other components of the device 224 to transmit, receive, interpret and process, and display information to a user. The safety application 225 may implement a variety of technologies inherent to device 224 to perform such bi-directional communications and data processing functionality according to one of ordinary skill in the art.

A Graphical User Interface (GUI) 228 in the illustrated embodiment 224 shows a large "ALERT" notification, which may be accompanied by other visual or auditory means (such as an alarm or other audible alert notification) as one of ordinary skill in the art will appreciate. A variety of additional functionality may be enabled by the application 225 such that, for example, a visual image 226 of the occupant 207 of the vehicle 202 may be shown to the user. In addition, other information indicative of various current physical characteristics of the enclosed environment 204 may be proved to the user on the device 224, such as current temperature, auditory information such as noises emanating from the occupant 207, or other sources in the enclosed environment 204, or other information.

Figure 3:
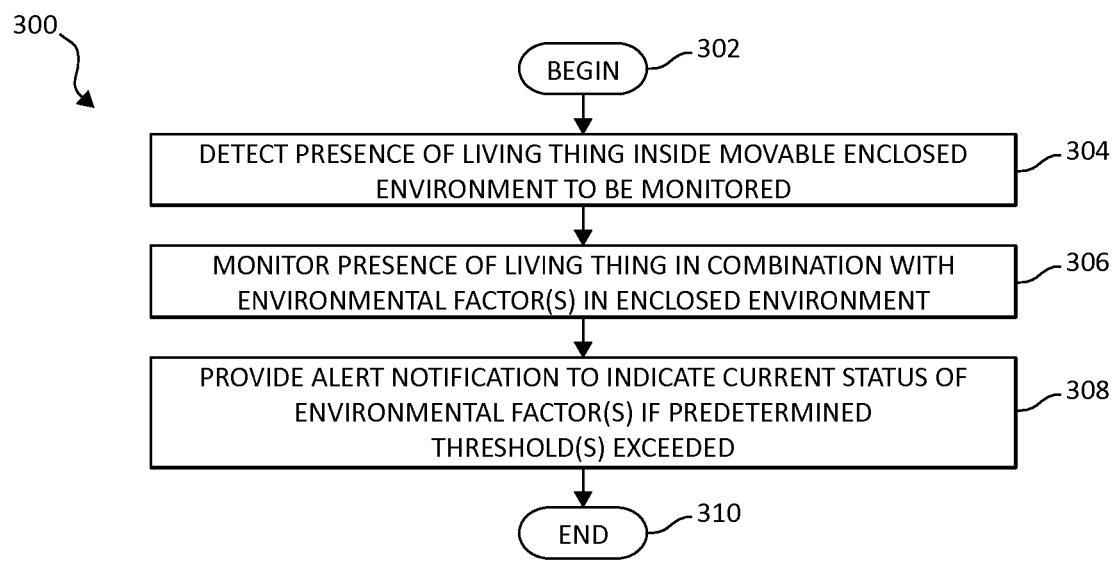
FIG. 3 is a flow chart diagram illustrating an exemplary method for monitoring for safety by a processor, in accordance with various aspects of the present invention.

Turning now to FIG. 3, a flow chart diagram, illustrating an exemplary method 300 for monitoring for safety of an enclosed, movable environment, using a processor, among other aspects of the illustrated embodiments, is depicted. Method 300 begins (step 302). As a first step, the presence of a living thing in the environment to be monitored is detected (step 304). In this step, the various physical attributes of the enclosed environment may be retrieved to construct a virtualization of the enclosed environment in which the occupant is monitored.

Step 306, following, initializes, maintains, and tracks (in real-time, for example), the person, pet, or other occupant of the enclosed environment. At a subsequent time, if any of the physical characteristics change, for example, those modifications are tracked by the system and identified. Based on this regime, if the physical characteristics change to the point that a threshold is exceeded, for example, an alert notification is provided to indicate a current status of the various environmental factor(s) (step 308). The method 300 then ends (step 310).

Figure 4:
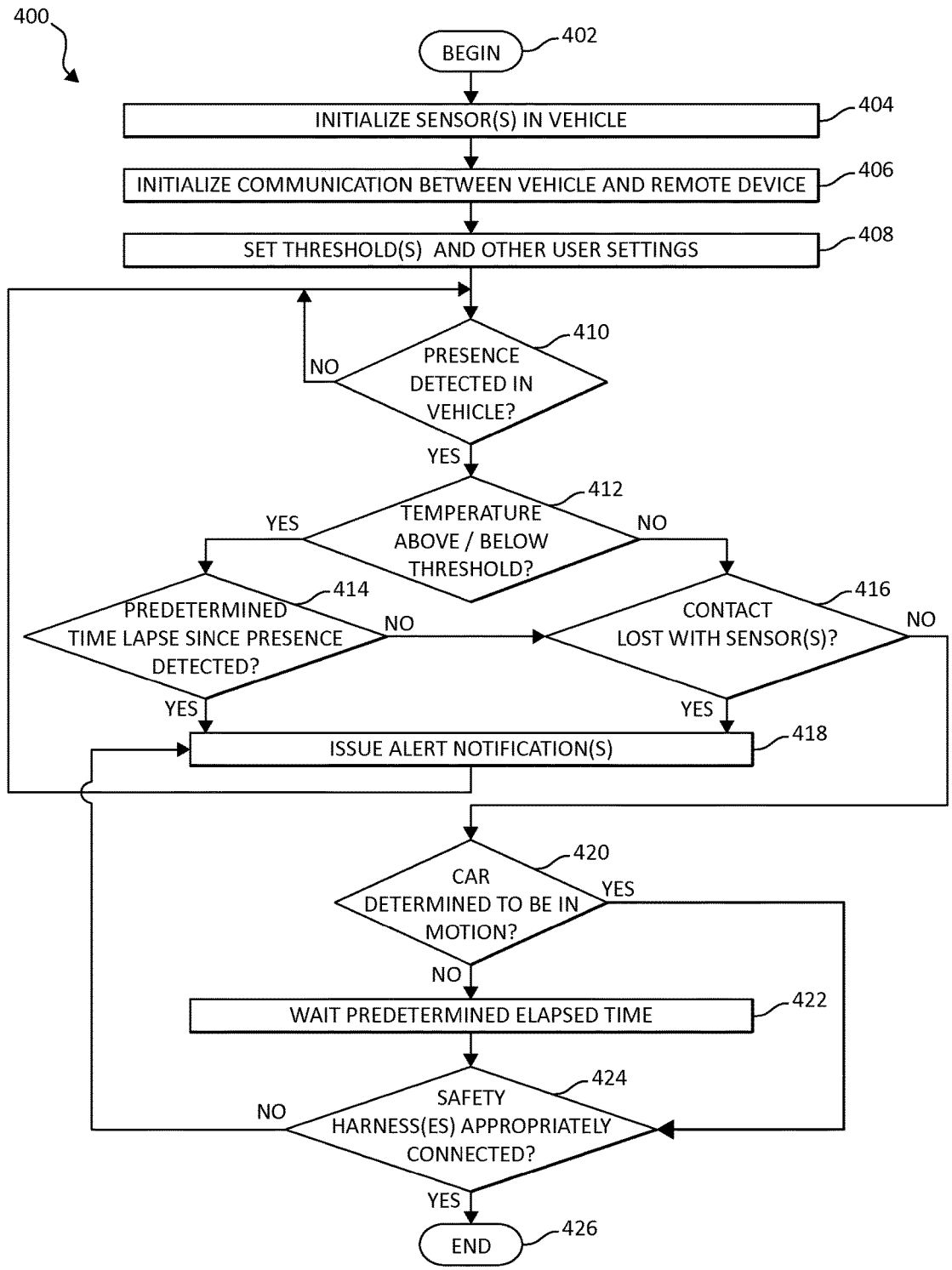
FIG. 4 is an additional flow chart diagram illustrating an additional exemplary method for monitoring for safety, again in which aspects of the present invention may be implemented.

Various aspects of the generalized steps in FIG. 3, previously, are further detailed, along with other inventive aspects of the mechanisms of the illustrated embodiments, in FIG. 4, following, which illustrates an additional method 400 for monitoring for safety according to the present invention.

Method 400 begins (step 402) with the initialization of various sensor(s) in a movable enclosed environment, such as a vehicle (404). The initialization step 404 may include other functionality such as the construction of a virtualized version of the enclosed environment in the system, or other setup tasks necessary to begin the monitoring aspects of the present invention.

As a next step, communication is initialized between the vehicle and a remote device, such as a handheld or other device previously described (step 406). Step 406 also contemplates the installation of an application or other monitoring software, hardware, or firmware on the remote device, and the setup steps necessary to begin bi-directional communication between the remote device and the system according to one of ordinary skill in the art, such as, for example, registration in a database by the user, setup of a username, password, and other login steps sufficient to enable use of the application by the user on the remote device.

Once the initialization and beginning setup steps are completed, the user may, in one embodiment, take steps to configure the application (and thereby the system) for particular monitoring functionality. For example, the user may set user-defined temperature thresholds (or a temperature window). The tasks of setting these various user-defined settings and other system settings is set out in step 408 as shown.

Once the various setup and initialization functions have been completed, the system then begins an operational/monitoring mode, beginning with decision step 410, which queries whether the presence of an occupant is detected. If no, the system continues to monitor for that presence. Once the presence is detected, the method 400 moves to decision step 412, which queries whether the ambient temperature in the vehicle (or, in other embodiments, the surface temperature of a portion of the interior environment, the occupant, or other temperatures) is above or below a set threshold. If yes, the method 400 then moves to decision step 414, which queries whether a predetermined time has elapsed since the presence was first detected. Decision step 414 (and similar functionality) allows the system built-in fuzzy logic to disregard situations where, for example, the vehicle is initially at a temperature above threshold but the air conditioning system in the vehicle has not activated such to lower the temperature.

If a predetermined time has elapsed, the method 400 issues an alert notification in various forms, such as that previously described and depicted (step 418). Returning to step 414, if a predetermined time has not elapsed, the method 400 moves to decision step 416, which queries whether contact has been lost with the vehicle/sensor(s). If yes, the method 400 issues an alert notification as previously in step 418. These two exemplary decision steps (step 414, and 416), are intended to show the various real-time monitoring, comparative, and decision making steps that may be carried out by the various mechanisms of the illustrated embodiments in a particular monitoring scenario.

Returning to step 416, if contact is not lost, the method 400 moves to decision step 420, which queries whether the vehicle is determined to be in motion. If no, the method waits a predetermined elapsed time in step 422, before querying in decision step 424 whether the safety harness(es) for the occupant are appropriately secured. If so, the method 400 ends (step 426). If the harnesses are not appropriately secured, the method 400 returns to step 418 where an alert notification is issued.

Returning to step 420, if the car is determined to be in motion, the method 400 immediately moves to decision step 424, and again queries whether the safety harnesses have been appropriately secured, issuing the alert notification(s) in step 418 as necessary.

While the various decision steps 410, 412, 414, 416, 424, and 424 are illustrative of the various monitoring, comparison and decision making steps that may be undertaken by the functionality inherent in the present invention, these steps are not exhaustive of the various possible monitoring steps, decision making steps, and comparative steps that may be completed, as one of ordinary skill in the art will appreciate. For example, in other embodiments, various auditory cues, or facial cues of the occupant may be monitored. If a particular auditory cue is observed, an alert notification may be issued. Similarly, if a visual or other environmental observation is recorded, an alert notification may be issued. A variety of environmental monitoring, comparison, and decision making steps may be employed according to a particular implementation (or according to user preference as set up by the user on the remote device, for example).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for monitoring safety, by a processor device, comprising:
   detecting a presence of a living thing inside an enclosed environment to be monitored, the enclosed environment capable of motion; wherein detecting the presence of the living thing further includes detecting, by a camera sensor equipped with a microphone housed within the enclosed environment and using facial recognition mechanisms performed on images captured by the camera sensor in conjunction with auditory cues captured by the microphone, whether the living thing is at least one of a human occupant and an animal occupant; and monitoring the presence of the living thing in combination with at least one environmental factor in the enclosed environment;

wherein if the at least one environmental factor exceeds a predetermined threshold, an alert notification to indicate a current status of the environmental factor is provided to a user, and wherein the at least one environmental factor comprises a temperature of the enclosed environment, and further wherein the alert notification is provided to a remote device if the temperature is determined to exceed one of an adjustable, predetermined high and adjustable, predetermined low threshold notwithstanding a fuzzy logic is used such that the alert notification is delayed for a period of time if it is determined that a climate control system of the enclosed environment has not yet activated to bring the temperature of the enclosed environment within the adjustable, predetermined high and adjustable, predetermined low threshold.

2. The method of claim 1, wherein the enclosed environment incorporates at least a portion of an interior cabin of a vehicle, and monitoring the presence of the living thing includes detecting the living thing via a pressure sensor associated with a surface in which the living thing rests to activate the pressure sensor.

3. The method of claim 1, further including providing the alert notification to the remote device using one of a wired and wireless communications protocol.

4. The method of claim 3, further including providing the alert notification if communication is lost to the remote device.

5. The method of claim 1, wherein the at least one environmental factor further comprises a status of a restraint of the living thing in the enclosed environment, wherein the predetermined threshold further includes a movement, and further wherein the alert notification is provided if the living thing is determined one of unrestrained and incorrectly restrained when the enclosed environment is determined to be in motion.

6. A system for monitoring safety, comprising:

a processor device that:

detects a presence of a living thing inside an enclosed environment to be monitored, the enclosed environment capable of motion; wherein detecting the presence of the living thing further includes detecting, by a camera sensor equipped with a microphone housed within the enclosed environment and using facial recognition mechanisms performed on images captured by the camera sensor in conjunction with auditory cues captured by the microphone, whether the living thing is at least one of a human occupant and an animal occupant, and monitors the presence of the living thing in combination with at least one environmental factor in the enclosed environment;

wherein if the at least one environmental factor exceeds a predetermined threshold, an alert notification to indicate a current status of the environmental factor is provided to a user, and wherein the at least one environmental factor comprises a temperature of the enclosed environment, and further wherein the alert notification is provided to a remote device if the temperature is determined to exceed one of an adjustable, predetermined high and adjustable, predetermined low threshold notwithstanding a fuzzy logic is used such that the alert notification is delayed for a period of time if it is determined that a climate control system of the enclosed environment has not yet activated to bring the temperature of the enclosed environment within the adjustable, predetermined high and adjustable, predetermined low threshold.

7. The system of claim 6, wherein the enclosed environment incorporates at least a portion of an interior cabin of a vehicle, and the processor device, pursuant to monitoring the presence of the living thing, detects the living thing via a pressure sensor associated with a surface in which the living thing rests to activate the pressure sensor.

8. The system of claim 6, further including a module controlled by the remote device; wherein the processor device provides the alert notification to the module using one of a wired and wireless communications protocol.

9. The system of claim 8, wherein the processor device provides the alert notification if communication is lost to the remote device.

10. The system of claim 6, wherein the at least one environmental factor further comprises a status of a restraint of the living thing in the enclosed environment, wherein the predetermined threshold further includes a movement, and further wherein the alert notification is provided if the living thing is determined one of unrestrained and incorrectly restrained when the enclosed environment is determined to be in motion.

11. A computer program product for monitoring safety by a processor, the computer program product comprising a non-transitory computer-readable storage medium having computer-readable program code portions stored therein, the computer-readable program code portions comprising:

a first executable portion that detects a presence of a living thing inside an enclosed environment to be monitored, the enclosed environment capable of motion; wherein detecting the presence of the living thing further includes detecting, by a camera sensor equipped with a microphone housed within the enclosed environment and using facial recognition mechanisms performed on images captured by the camera sensor in conjunction with auditory cues captured by the microphone, whether the living thing is at least one of a human occupant and an animal occupant, and a second executable portion that monitors the presence of the living thing in combination with at least one environmental factor in the enclosed environment;

wherein if the at least one environmental factor exceeds a predetermined threshold, an alert notification to indicate a current status of the environmental factor is provided to a user, and wherein the at least one environmental factor comprises a temperature of the enclosed environment, and further wherein the alert notification is provided to a remote device if the temperature is determined to exceed one of an adjustable, predetermined high and adjustable, predetermined low threshold notwithstanding a fuzzy logic is used such that the alert notification is delayed for a period of time if it is determined that a climate control system of the enclosed environment has not yet activated to bring the temperature of the enclosed environment within the adjustable, predetermined high and adjustable, predetermined low threshold.

12. The computer program product of claim 11, wherein the enclosed environment incorporates at least a portion of an interior cabin of a vehicle, and further including a third executable portion that, pursuant to monitoring the presence of the living thing, detects the living thing via a pressure sensor associated with a surface in which the living thing rests to activate the pressure sensor.

13. The computer program product of claim 11, further including a third executable portion that provides the alert notification to the remote device using one of a wired and wireless communications protocol.

14. The computer program product of claim 13, further including a fourth executable portion that provides the alert notification if communication is lost to the remote device.

15. The computer program product of claim 11, wherein the at least one environmental factor further comprises a status of a restraint of the living thing in the enclosed environment, wherein the predetermined threshold further includes a movement, and further including a third executable portion that provides the alert notification if the living thing is determined one of unrestrained and incorrectly restrained when the enclosed environment is determined to be in motion.

* * * * *